United States Patent
Goren et al.

(10) Patent No.: US 10,587,348 B2
(45) Date of Patent: Mar. 10, 2020

(54) SYSTEMS AND METHODS FOR UNDERWATER COACHING SYSTEMS

(71) Applicant: Swimmersive Co., Encino, CA (US)

(72) Inventors: Sheera Goren, Encino, CA (US);
Charles Melvoin, Encino, CA (US);
Frank Dunn, Encino, CA (US)

(73) Assignee: Swimmersive Co., Encino, CA (US)

( * ) Notice: Subject to any disclaimer, the term of this patent is extended or adjusted under 35 U.S.C. 154(b) by 0 days.

(21) Appl. No.: 16/132,303

(22) Filed: Sep. 14, 2018

(65) Prior Publication Data
US 2019/0089469 A1    Mar. 21, 2019

Related U.S. Application Data

(60) Provisional application No. 62/559,319, filed on Sep. 15, 2017.

(51) Int. Cl.
| | |
|---|---|
| H04B 13/02 | (2006.01) |
| H04B 1/04 | (2006.01) |
| H04B 1/18 | (2006.01) |
| H01Q 1/22 | (2006.01) |
| H01Q 1/27 | (2006.01) |

(Continued)

(52) U.S. Cl.
CPC ........... H04B 13/02 (2013.01); H01Q 1/04 (2013.01); H01Q 1/2291 (2013.01); H01Q 1/273 (2013.01); H01Q 1/36 (2013.01); H04B 1/04 (2013.01); H04B 1/18 (2013.01); H04B 1/385 (2013.01); H01Q 9/26 (2013.01)

(58) Field of Classification Search
CPC . H04B 13/02; H04B 1/04; H04B 1/18; H01Q 9/26
USPC ............................................................. 455/40
See application file for complete search history.

(56) References Cited

U.S. PATENT DOCUMENTS

| | | |
|---|---|---|
| 4,791,673 A | 12/1988 | Schreiber |
| 7,310,427 B2 | 12/2007 | Retchin et al. |

(Continued)

FOREIGN PATENT DOCUMENTS

| | | |
|---|---|---|
| AU | 2003257031 B2 | 7/2008 |
| EP | 1540992 A2 | 6/2005 |

(Continued)

OTHER PUBLICATIONS

JP2009045179(A) Translation (Year: 2009).*

(Continued)

*Primary Examiner* — Lee Nguyen
(74) *Attorney, Agent, or Firm* — KPPB LLP

(57) ABSTRACT

Systems and methods for underwater coaching systems in accordance with embodiments of the invention are disclosed. In one embodiment, a wireless communication system includes a receiver system including a receive antenna configured to receive a radio frequency signal, at least two impedance matching networks, a first water-adapted impedance matching network adapted for reception in a water environment and a second air-adapted impedance matching network adapted for reception in an air environment, a switch configured to select between the at least two impedance matching networks, a signal decoding circuit configured to decode a received radio frequency signal, an amplifier configured to amplify a decoded signal, and a user output.

9 Claims, 10 Drawing Sheets

(51) Int. Cl.
  *H01Q 1/36* (2006.01)
  *H04B 1/3827* (2015.01)
  *H01Q 1/04* (2006.01)
  *H01Q 9/26* (2006.01)

(56) References Cited

U.S. PATENT DOCUMENTS

| | | | |
|---|---|---|---|
| 7,711,322 | B2 | 5/2010 | Rhodes et al. |
| 8,111,860 | B2 | 2/2012 | Retchin et al. |
| 9,308,377 | B1 | 4/2016 | Schaefer |
| 9,668,041 | B2 | 5/2017 | Vavrus et al. |
| 2007/0155347 | A1 | 7/2007 | Heuermann et al. |
| 2009/0161893 | A1 | 6/2009 | Hironaka et al. |
| 2009/0212969 | A1 | 8/2009 | Voss |
| 2009/0213697 | A1 | 8/2009 | Irie |
| 2012/0011990 | A1 | 1/2012 | Mann |
| 2013/0265500 | A1* | 10/2013 | Kalbus ............... H04H 60/39 348/729 |
| 2014/0099615 | A1* | 4/2014 | Sweeney ............. A61B 5/7405 434/254 |
| 2015/0009079 | A1* | 1/2015 | Bojer ................... H01Q 9/145 343/745 |
| 2015/0122533 | A1* | 5/2015 | Kao ..................... H05K 3/4661 174/257 |
| 2016/0301138 | A1 | 10/2016 | Hwang et al. |
| 2018/0234190 | A1 | 8/2018 | Rauhala |

FOREIGN PATENT DOCUMENTS

| | | |
|---|---|---|
| EP | 1540992 A4 | 1/2011 |
| JP | 2009045179 A | 3/2009 |
| WO | 2019070387 A2 | 4/2019 |

OTHER PUBLICATIONS

"New Technology Takes Coach Off the Pool Deck & Into the Water", SwimSwam, Retrieved from: https://swimswam.com/new-technology-takes-coach-off-the-pool-deck-into-the-water/, Sep. 14, 2015, 4 pgs.

Abdou et al., "A matched Bow-tie antenna at 433MHz for use in underwater wireless sensor networks", Journal of Physics: Conference Series, vol. 450, No. 1, 2013, 8 pgs.

Davies, "Subsea Wireless Communication: Technology comparison and Review", Juice-DSP, Dorset, United Kingdom, 25 pgs.

Gussen et al., "A Survey of Underwater Wireless Communication Technologies", Journal of Communication and Information Systems, vol. 31, No. 1, Oct. 27, 2016, pp. 242-255.

Hattab et al., "An Underwater Wireless Sensor Network with Realistic Radio Frequency Path Loss Model", Hindawi Publishing Corporation, International Journal of Distributed Sensor Networks, vol. 2013, Mar. 5, 2013, 9 pgs.

Hua et al., "Optically transparent broadband water antenna", International Journal of RF and Microwave Computer-Aided Engineering, vol. 28, No. 4, May 2018, e21219.

Karagianni, "Electromagnetic Waves under Sea: Bow-Tie Antenna Design for Wi-Fi Underwater Communications", Progress in Electromagnetics Research M, vol. 41, Mar. 2015, pp. 189-198.

Kuzlu et al., "Design of Impedance Matching Network for B&K 8104 Hydrophone via Direct Computational Technique for Underwater Communication", IEEE 2010 10th Mediterranean Microwave Symposium, Guzelyurt, Cyprus, Aug. 25-27, 2010, pp. 399-402.

Miquel, "UWB Antenna Design for Underwater Communications", Delft University of Technology, Thesis, May 25, 2009, 93 pgs.

Palmer et al., "On Air-to-Water Radio Communication between UAVs and Water Sensor Networks", 2015 IEEE International Conference on Robotics and Automation (ICRA), Seattle, Washington, May 26-30, 2015, 7 pgs.

Sanchez et al., "An Acoustic Modem Featuring a Multi-Receiver and Ultra-Low Power", Circuits and Systems, vol. 6, No. 1, Jan. 14, 2015, 13 pgs.

Sendra et al., "Underwater Wireless Communications in Freshwater at 2.4 GHz", IEEE Communications Letters, vol. 17, No. 9, Sep. 2013, Date of Publication: Aug. 6, 2013, pp. 1794-1797.

Wu et al., "Design and implementation of underwater wireless electromagnetic communication system", AIP Conference Proceedings, vol. 1864, Aug. 3, 2017, 5 pgs.

Yang et al., "Study of a water-immersed ultra-wide band microstrip patch antenna", 2017 Progress in Electromagnetics Research Symposium—Fall, Singapore, Singapore, Nov. 19-22, 2017.

Yip et al., "Antenna design for the propagation of EM waves in seawater", International Journal of the Society for Underwater Technology, vol. 28, No. 1, Nov. 2008, pp. 11-20.

International Search Report and Written Opinion for International Application No. PCT/US2018/051237, Search completed Feb. 26, 2019, dated Mar. 25, 2019, 13 Pgs.

* cited by examiner

Headset Receiver

- Output - 2x Bone Conduction Transducer
- Radio Communication - 28MHz
  o Signal Transmission depth - min 1 foot
  o Range >50m
  o 10+ Frequency Channels
- Battery - 4 - 8 hours
- Power Connection
  o Pogo Connector / Induction Charger
- Display/Indicator
  o LEDs / E-Ink Display
- Power On - Button Switch
- Volume Controls - Button Switch
- Channel Selection - Button Switch
- PCB
  o Power Management
  o Radio Receiver
  o Audio Amp
  o User Interface Logic

Radio Transmitter

- Radio Communication - 28MHz
  o Signal Transmission depth - min 1 foot
  o Range >50m
  o 10+ Frequency Channels
- Battery - Rechargeable Lithium Ion (12 -15 Hours)
- Power Connection
  o Pogo Connector / Barrel Jack
- Display/Indicator
  o LEDs / E-Ink Display
- Push to talk switch
- Push to talk Mic
- Antenna
- PCB
  o Power Management
  o Radio Transmitter
  o Audio Amp + Mixer
  o User Interface Logic
- Audio Line-in
  o 2x 3.5 Jack (Mic and AUX)
  o 1x Bluetooth Connection (Media Player or Wireless Bluetooth Headset)

Case

- Battery (Potential Upgrade)
  o 2x charge of Headset
- PCB
  o Power Management
- Power Connection
  o Pogo Connector / Induction Charger

*FIG. 6*

SYSTEMS AND METHODS FOR UNDERWATER COACHING SYSTEMS

RELATED APPLICATIONS

The present application claims priority to U.S. Provisional Application Ser. No. 62/559,319 filed Sep. 15, 2017, the disclosure of which is incorporated by reference in its entirety.

COLOR DRAWINGS

The patent or application file contains at least one drawing executed in color. Copies of this patent or patent application publication with color drawing(s) will be provided by the Office upon request and payment of the necessary fee.

FIELD OF THE INVENTION

The present invention relates to transmitting audio and more specifically to transmitting at least one audio stream from an air-based transmitter to a water-based receiver.

BACKGROUND

Radio frequency (RF) communication is the use of radio waves to transmit data wirelessly between a transmitter and a receiver. Bluetooth is a low-power wireless connectivity technology used to stream audio, transfer data and broadcast information between devices.

SUMMARY OF THE INVENTION

Systems and methods for underwater coaching systems in accordance with embodiments of the invention are disclosed. In one embodiment, a wireless communication system includes a receiver system including a receive antenna configured to receive a radio frequency signal, at least two impedance matching networks, a first water-adapted impedance matching network adapted for reception in a water environment and a second air-adapted impedance matching network adapted for reception in an air environment, a switch configured to select between the at least two impedance matching networks, a signal decoding circuit configured to decode a received radio frequency signal, an amplifier configured to amplify a decoded signal, and a user output.

In a further embodiment, the receive antenna is a folded dipole with equivalent length in free space of 75 cm.

In another embodiment, the receive antenna is printed on a receiver enclosure using laser direct structuring.

In a still further embodiment, at least one impedance matching network includes two capacitors in parallel connected to an inductor in series to ground.

In still another embodiment, the switch is controlled by the output of a water sensor to select the water-adapted impedance matching network when the output indicates a water environment and to select the air-adapted impedance matching network when the output indicates an air environment.

In a yet further embodiment, the user output includes one or more bone conduction elements.

In yet another embodiment, the wireless communication system also includes a transmitter system including one or more audio inputs, an audio encoder, an amplifier, and a transmit antenna.

In a further embodiment again, the one or more audio inputs of the transmitter system includes at least two audio inputs, one of which is a microphone, and the transmitter system further includes a mixer.

In another embodiment again, the audio encoder is configured to generate a radio frequency signal in a band between 174-216 MHz.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the detailed description and/or appended claims.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 6 is a listing of technical specifications for a headset receiver, a headset transmitter, and a case in accordance with an embodiment of the invention.

DETAILED DESCRIPTION

Figure 1:
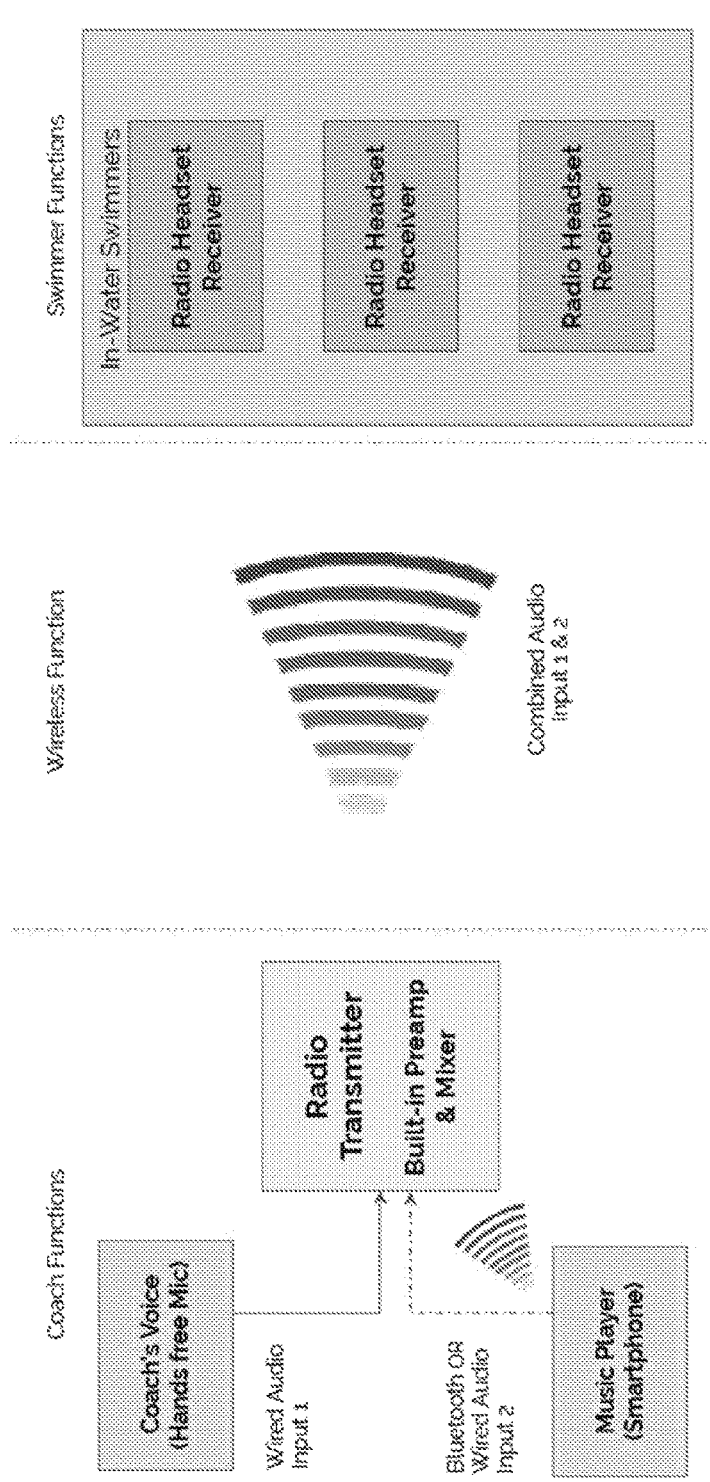
FIG. 1 conceptually illustrates an underwater coaching system in accordance with an embodiment of the invention.

Turning now to the drawings, systems and methods for underwater coaching systems in accordance with embodiments of the invention are disclosed. Many people participate in water-based activities, such as swimming, rowing, sailing, and aerobics. Existing techniques for coaching participants in water-based activities include yelling at the participants from a distance and post-activity debriefing as it is difficult or impossible for instructors or coaches to interact directly with the participants while they are in the water. Underwater coaching systems in accordance with embodiments of the invention overcome these limitations and allow coaches and instructors to communicate directly with the participants, even when the participants are underwater or are a significant distance away from the coach or instructor. Conventional wireless communications systems are often unusable underwater or from air to water because the signals are severely attenuated in water. Wireless receiver systems in accordance with many embodiments of the invention provide the ability to receive a wireless signal through a substantial distance in water by impedance matching the receiver circuitry and/or antenna to water. In several embodiments, the impedance matching is calibrated to clean pool water. In some embodiments, the impedance matching is switchable between modes to receive in air and water. In further embodiments, the switching between air and water modes can be dynamically performed in response to a sensor output indicating whether the receiver is in air or is in water. In FIG. 1, a conceptual illustration of an underwater coaching system 100 in accordance with an embodiment of the invention is shown. A coach's voice can be captured by a microphone as audio input 12 and optionally supplemental audio (e.g., Bluetooth or wired) can be provided as audio input 2. Audio inputs 1 and 2 can be combined and transmitted wirelessly to one or more radio headset receivers, which can be used by swimmers. Wireless transmitters and receivers that may be utilized in accordance with embodiments of the invention are described more fully below.

Wireless Transmitters

Figure 2:
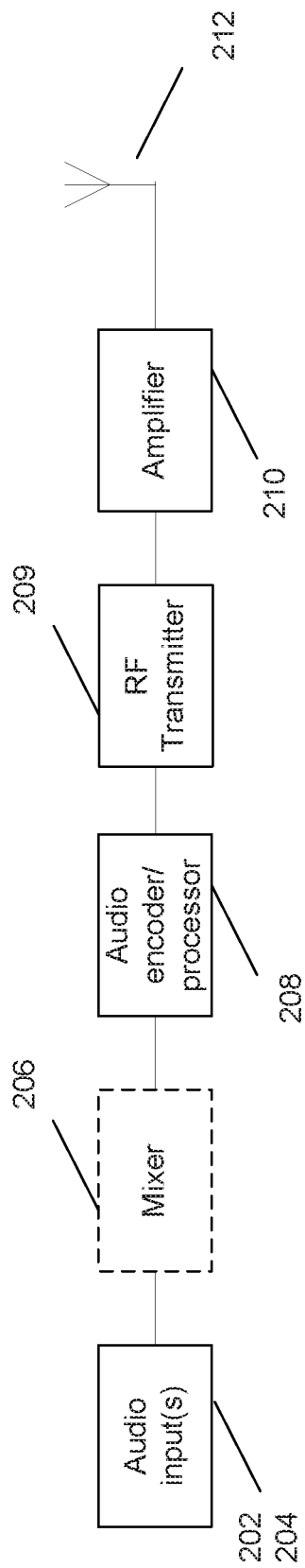
FIG. 2 conceptually illustrates components of a wireless transmitter in accordance with an embodiment of the invention.

Underwater coaching systems in accordance with embodiments of the invention can include one or more transmitters, one or more receivers/headsets, and/or a case. The coaching system transmitter is used to transmit audio data to one or more headset(s) that are worn by the participant(s). A wireless transmitter 200 that may be utilized in accordance with an embodiment of the invention is conceptually illustrated in FIG. 2. Components of the transmitter 200 can include one or more audio inputs 202 and 204 (e.g., microphone and optionally supplemental audio (e.g., Bluetooth or wired)), mixer 206 to combine or switch between audio inputs 202 and 204, audio encoder/processor circuitry 208, radio frequency (RF) transmitter 209, amplifier 210 to amplify the signal for transmission, antenna 212. Several embodiments also include a battery (e.g., lithium polymer or other appropriate power source).

The transmitter 200 is capable of receiving input from one or more audio sources at audio inputs 202 and/or 204, such as but not limited to a microphone and/or a portable audio device. The audio sources can be connected directly and/or wirelessly, such as via a Bluetooth connection, as appropriate to the requirements of specific applications of embodiments of the invention. In a variety of embodiments, the transmitter 200 includes a variety of input devices, such as a push-to-talk input that controls the transmission of voice data captured using a microphone, a play/pause input that controls the inclusion of audio from an audio device, volume controls, and/or any other input as appropriate to the requirements of specific applications of embodiments of the invention. The transmitter can combine the audio data received from the audio source(s) using a mixer 206. The audio data from the one or more sources can be processed (e.g., balancing and/or equalizing) and encoded using audio encoder/processor 208 into a single transmission signal using RF transmitter 209. The transmitter 200 can amplify the transmission signal using amplifier 210 and transmit the signal to the headsets using antenna 212.

The transmission of the audio to the headsets can be based on a pairing of headsets to the transmitter and/or a general broadcast at a particular frequency (or set of frequencies). For a general broadcast, any headset tuned to the appropriate frequency (or set of frequencies) would be able to receive the transmitted signal. The frequencies and modes of communication can be pre-determined and/or dynamically adjustable, thereby allowing the transmitter to communicate with devices over distances appropriate to the activity. For example, sailboats may be hundreds of yards apart while a coach working with swimmers will likely be within 50 yards of the swimmers. This adjustable frequency and power can also be used to improve the power efficiency of the system, allowing for longer battery life in lower-power modes at the cost of reduced transmission distance.

In many embodiments of the invention, the transmitter uses a 200 KHz channel in a band between 174-216 MHz (CFR § 15.236). The transmitter can use one of several channels allocated across the band and may transmit at the maximum power allowed in the band of 50 mW EIRP. In some embodiments, the transmitter checks for a quiet channel (e.g., one that is relatively noise free and/or not used by other undesired devices) before use. It can do this by listening to several channels in the band and choosing one of the quietest channels. In several embodiments, status feedback to the user can be provided by an LED, such as a green LED, that can blink during the searching phase and turn solid to indicate the transmitter has selected a channel to use.

In several embodiments, the transmit frequency is selected based on one or more of the following criteria:
  Loss in water (typically lower is better)
  Loss at water/air interface (typically higher is better)
  Antenna size (typically higher is better)
  Regulatory band available
  ICs available to fit industrial design (not all frequencies are available)

Any of a variety of transmitter circuitry may be utilized in a transmitter in accordance with embodiments of the invention, including, but not limited to, components such as an OnSemi AX8052F143 integrated circuit (IC) for generating the signal and/or interfacing with user controls and/or an AFIC901N RF power amplifier to amplify the transmitted signal. Additional components can include an ST microelectronics STM32F401 processor IC, Cypress Logic WM8988 CODEC, and/or a TI CC2560 BT chip. These components may be utilized to implement switching between analog sources (internal microphone, external microphone, wired audio, and Bluetooth audio), high level Bluetooth stack, and/or audio processing including adjustment of frequency response, and user interface functions.

In several embodiments, the transmitter utilizes a short coil antenna for transmission. For certain frequencies, such as those discussed further above, an ideal antenna would be a 37.5 cm whip antenna, although it may not be practical for a hand set form factor.

While specific components of wireless transmitters are discussed above with respect to FIG. 2, one skilled in the art will recognize that any of a variety of components or variations of components may be utilized in accordance with embodiments of the invention as appropriate to a particular application.

Wireless Receivers

Figure 3:
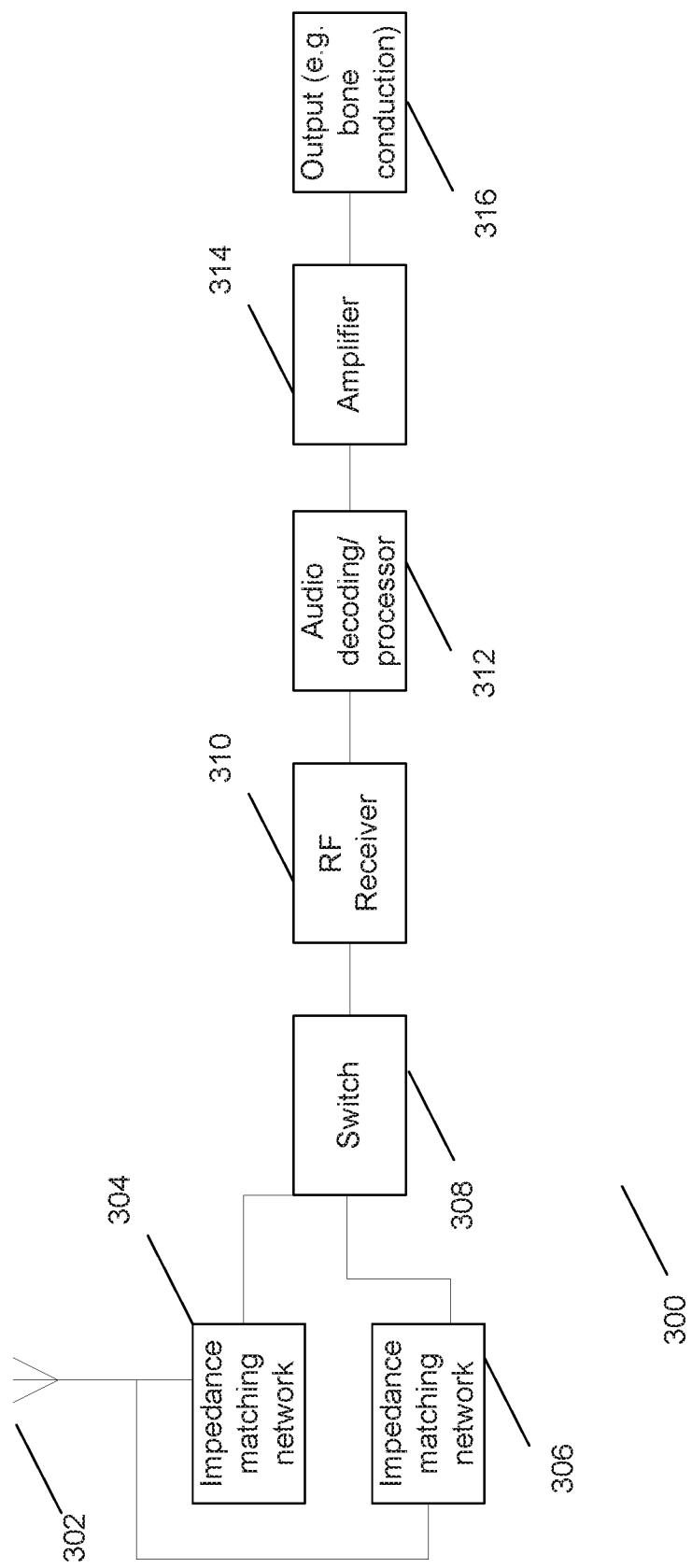
FIG. 3 conceptually illustrates components of a wireless receiver in accordance with an embodiment of the invention.

A wireless coaching system receiver in several embodiments of the invention includes receiver circuitry, which may be housed in a headset enclosure. In several embodiments of the invention, the headset enclosure of the receiver is configured to clamp or attach securely to a user's head. Receiver circuitry can include components such as, but not limited to, a receive antenna, one or more amplifiers, one or more audio decoders/processors, one or more impedance matching networks, and/or a battery (such as a lithium polymer battery). Elements of a wireless receiver 300 in accordance with an embodiment of the invention are conceptually illustrated in FIG. 3.

Figure 4A:
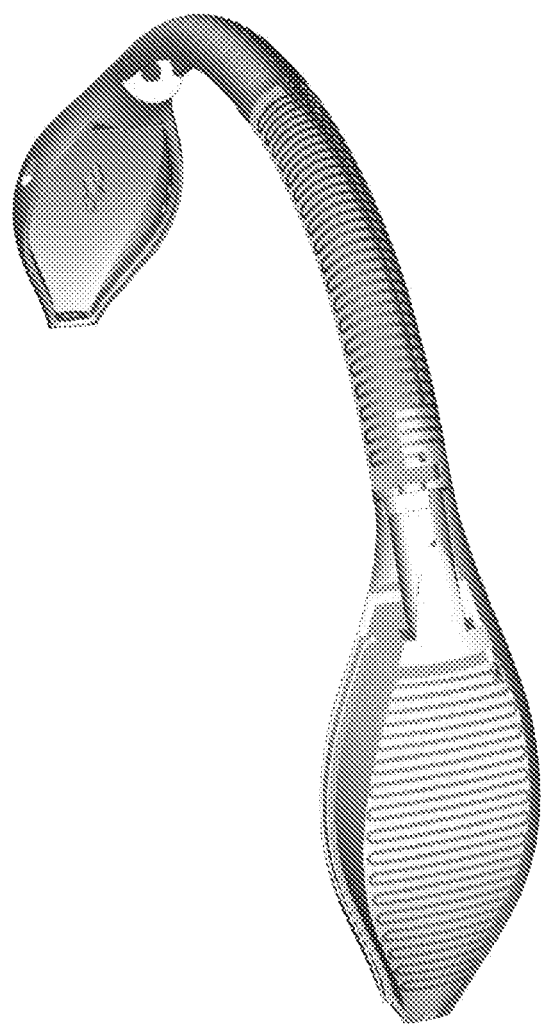
FIGS. 4A-4C illustrate a receive antenna for a headset receiver in accordance with an embodiment of the invention.
Figure 4B:
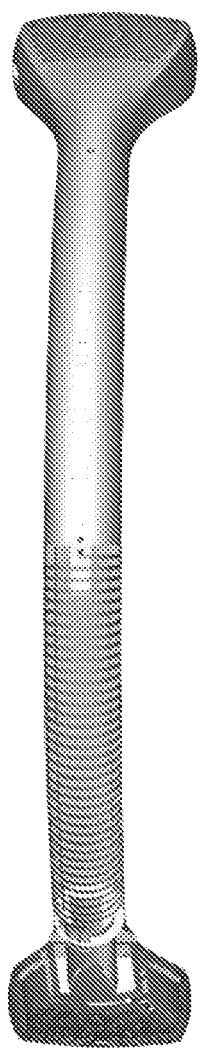
Figure 4C:
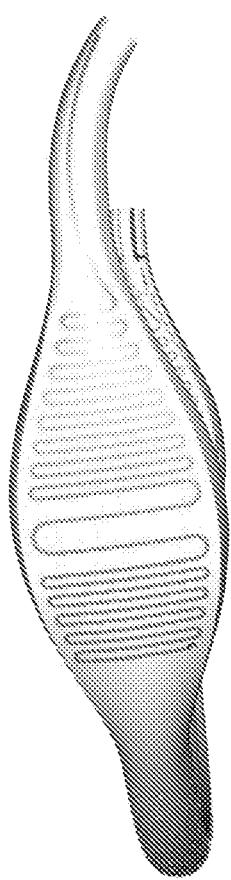

The receive antenna 302 can be used to receive radio frequency signals, such as those transmitted by a transmitter discussed further above. In many embodiments, the receive antenna is integrated or embedded into the inner or outer surface of the headset enclosure. The receive antenna can be, for example, printed on the outside surface on the antenna using LDS (Laser Direct Structuring) or a similar technique to get maximum performance for such a low frequency in such a small space. Low frequency is equivalent to a long wavelength, which means a 75 cm quarter wavelength antenna typically provides best results. In many embodiments, the receive antenna is a folded dipole with a center tap that is connected to the other receiver circuitry with 0.81 mm coax. In various embodiments, the receive antenna has an equivalent length close to 75 cm total trace for each lead in free space, which may be shorter in air or water. An antenna that is suitable for several embodiments of the invention is illustrated in FIGS. 4A-4C. As can be seen in the figures, the antenna can be run back and forth covering surfaces on one or both sides of the headset enclosure as well as portions of the middle to provide a long length of antenna within a limited area. One skilled in the art will recognize that variations to this design may be utilized in accordance with embodiments of the invention as suitable to a particular application.

Returning to FIG. 3, the receiver 300 may include one or more components that form an impedance matching network 304. In several embodiments of the invention, a switch or switching circuitry 308 electrically selectively connects one of two or more impedance matching networks that are adapted for different environments to the antenna and other receiver circuitry. In many embodiments, one impedance matching network 304 is adapted to provide the receiver circuitry with an impedance optimized for reception in water. Radio frequency (RF) loss through water is typically much higher than through air. RF loss depends on characteristics of the medium (e.g., free space, air, water, etc.). Matching impedance between the antenna in the medium (e.g., air or water) to the rest of the receiver circuitry provides maximum power transfer of the signal. Providing impedance matching can also be seen as minimizing the reflection of the signal at the receive antenna. In some embodiments, the water adapted impedance matching network is selected by default. In several embodiments, the receiver circuitry can be switched to a second impedance matching network 306 adapted for reception in air. The difference of impedance in air and in water is two orders of magnitude, and so using the water-adapted impedance matching network while receiving in air can still provide good performance. In certain embodiments, the water-adapted impedance matching network can be configured for the impedance in water and need not consider the impedance of air, as optimizing for water has a multiplier effect on the distance the signal can travel in air. Impedance matching networks can be designed for different types of water (e.g., salt water, fresh water, pool water, etc.) by using tests that can measure or calculate conductivity and/or impedance of a particular antenna in water of that type. A SKY13399 IC and passive components can be used to implement a switching impedance matching network, although any number of variations may be appropriate to suit a particular application. In several embodiments of the invention, passive components of an impedance matching network include a set of two capacitors in parallel connected to an inductor in series to ground, each capacitor connected to a connection on the IC. Particular values for the capacitors and inductor can be chosen to adapt to the impedance of a particular antenna in a particular type of water (e.g., clean pool water). In clean pool water, impedance matching networks can enable receivers in accordance with embodiments of the invention to receive signals travelling around or at least 3 feet of water.

In several embodiments, switching between impedance matching networks can be performed dynamically by using a water sensor. A water sensor can be, for example, an electrical conductivity meter that senses conductivity between two points or a sensor that detects cleanliness of water. In some embodiments, charging contacts on the headset can be used as a water sensor.

The receiver 300 includes a radio frequency (RF) receiver 310 to demodulate a received RF signal before providing it to audio decoder/processor 312 to extract an audio signal from the RF signal. Any of a variety of receiver circuitry for decoding and/or processing a received signal may be utilized in a receiver in accordance with embodiments of the invention, including, but not limited to, components such as an OnSemi AX8052F143 integrated circuit (IC) for processing the received signal and/or interfacing with user controls. The decoded/demodulated signal produces an audio signal. The audio signal can optionally be further be processed by passive circuitry to perform audio frequency response shaping, such as by, but not limited to, an OnSemi SA575. The decoded audio signal can be sent to an amplifier 314 that amplifies the signal enough to power one or more audio output elements 316.

In many embodiments, the receiver headset utilizes bone conduction technology in the audio output elements 316 to directly vibrate the bones in the inner ear, thereby providing underwater audio to the participants. Headsets utilizing bone conduction technology can be preferable in underwater coaching systems as they are more comfortable to the participants and enhance safety as the participants are still able to hear ambient noise when using the underwater coaching system. In a number of embodiments, the receiver utilizes a TI LM4811 chip to drive the bone conduction elements. In several embodiments, the bone conduction elements have an F0 of 300 Hz for better user performance.

In many embodiments of the invention, the receiver searches for a transmitted signal and selects a signal based on at least one characteristic of the signal, for example, but not limited to, RSSI (receive signal strength indicator). The receiver can initiate search upon power up. In several embodiments, status feedback to the user can be provided by an LED, such as a green LED, that can blink during the searching phase and turn solid to indicate the receiver has selected a signal to receive.

Figure 5A:
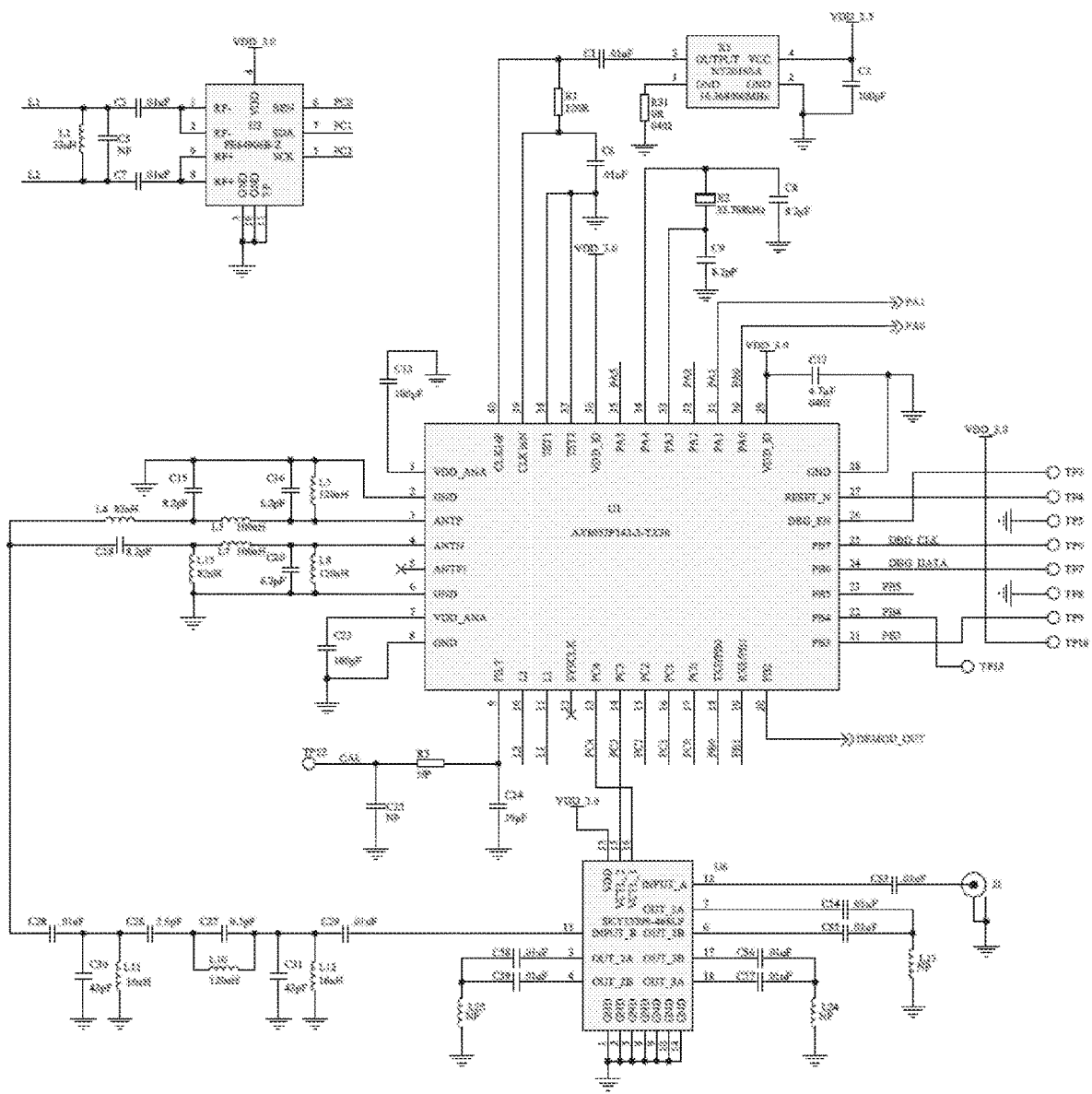
FIGS. 5A-5C illustrate circuit diagrams for a headset receiver in accordance with an embodiment of the invention.
Figure 5B:
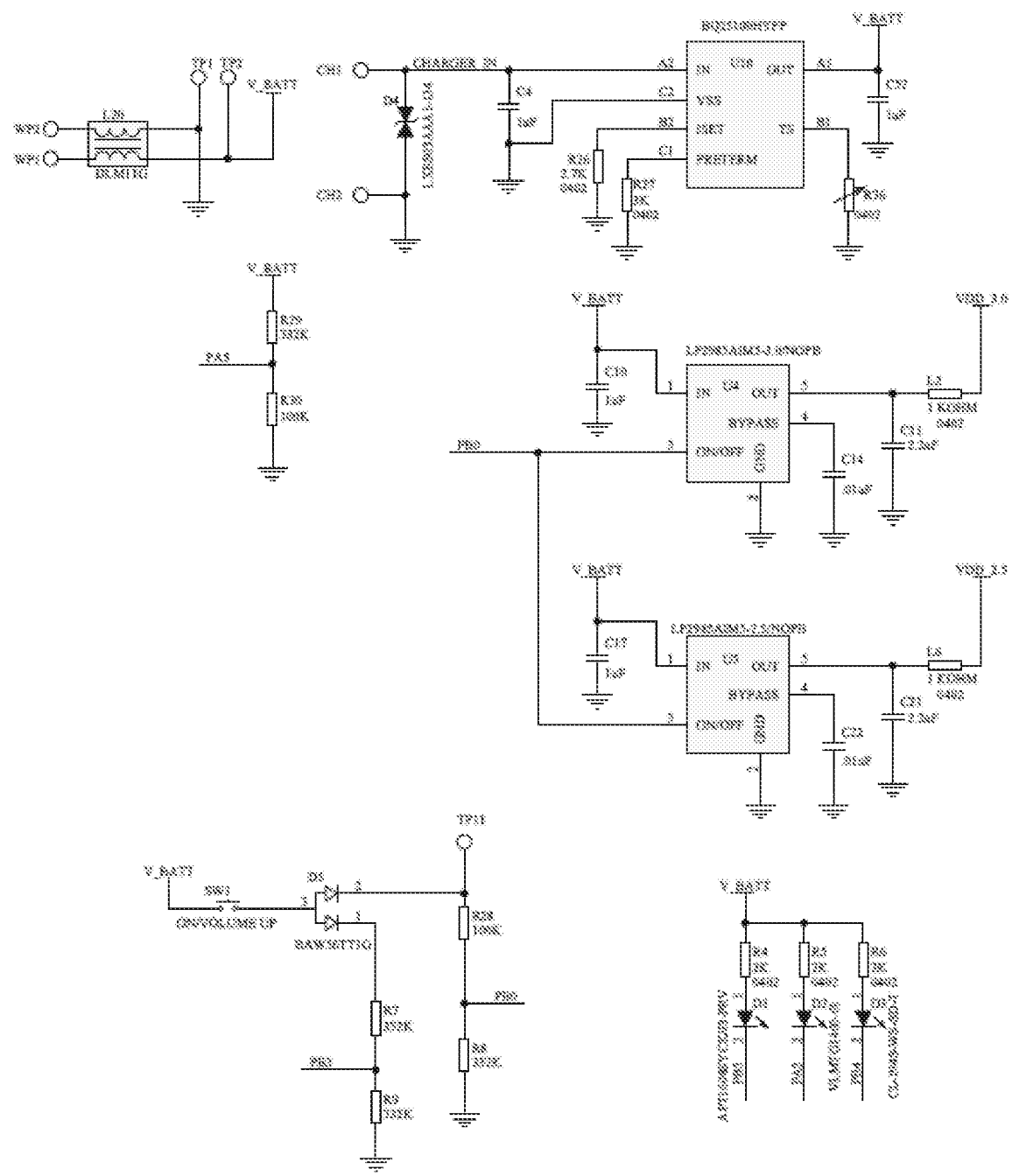
Figure 5C:
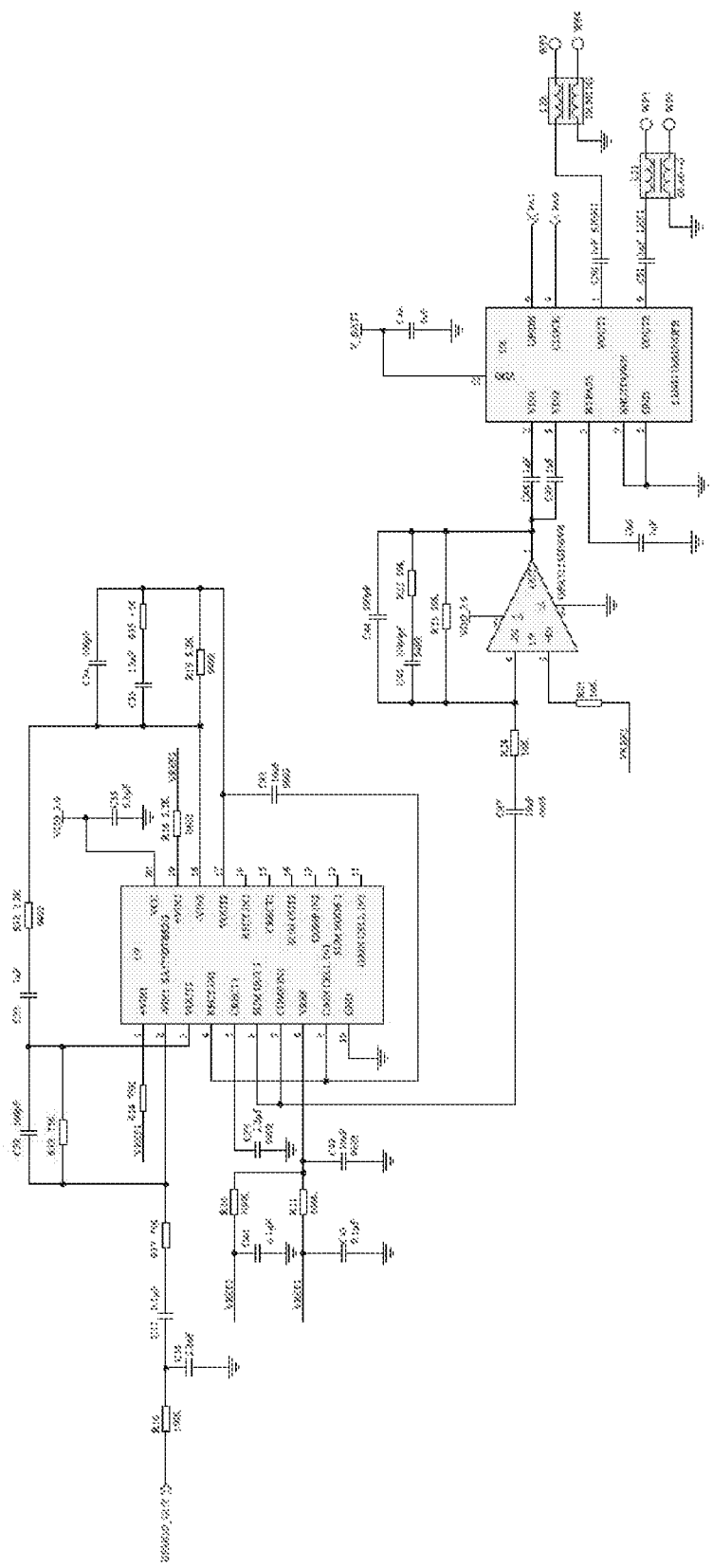

Circuit diagrams of receiver circuitry in accordance with an embodiment of the invention are illustrated in FIGS. 5A-5C. These components can include the IC U1 as an RF receiver/processor. The IC U6 is connected to a receive antenna at J1. U6 can act as a switch between impedance matching networks connected to differential input pins 3 and 4 and pins 17 and 18, providing output on pin 11 to pins 3 and 4 of U1 through another impedance matching network between the switch and RF receiver/processor. The impedance matching network that impedance matches the switch to RF receiver/processor includes first passing 3 stage bandpass filter circuit and by second passing through a 2 section unbalanced to balanced circuit (BALUN).

The 3 stage bandpass filter circuit may be described as a Chebyshev filter having equal termination impedances and 0.1 dB passband ripple.

The 2 section BALUN circuit may be described as having 2 impedance transformation sections. The first section, a single ended to differential ended circuit, performs the BALUN impedance matching function transforming the circuit impedance from 50 to 200 ohms. The second section(s), LC high pass filter circuit(s) connected to both the positive and negative input pins of the receiver, perform the impedance matching transformation(s) from 200 to 800 ohms.

The shunt inductors connected to both the positive and negative input pins of the receiver are needed for power amplifier bias considerations.

IC U3 can be used to select between frequency bands. Control circuitry can be connected at TP11 and battery charging circuitry using IC U10 at CH1 and CH2. ICs U4 and U5 can be used to provide a cleaner signal. An analog output signal from U1 can be provided as DEMOD_OUT to circuitry around IC U7 as an expander to achieve greater signal to noise. The signal can then be provided to amplifier U9 and IC U8 to drive bone conduction elements L21 and L22.

A receiver can also include one or more switchable input devices, such as those described above with respect to a wireless transmitter. While specific components of headset wireless receivers are discussed above with respect to FIGS. 3-5C, one skilled in the art will recognize that any of a variety of components or variations of components may be utilized in accordance with embodiments of the invention as appropriate to a particular application. For example, receiver circuitry may be housed together with audio output elements in a headset enclosure, or may be housed separately from audio output elements and provide the audio signal by wire or wirelessly to the audio output elements.

Storage and Charging Case

In many embodiments of the invention, the case is designed to store the transmitter(s) and headset(s) when they are not in use, thereby allowing for ease of transportation and storage. The case can also include a battery or other power source, thereby allowing the transmitter and/or receivers to be charged while stored in the case. All of the devices in the underwater coaching system can be waterproof, both freshwater and saltwater, thereby allowing the underwater coaching system to be used in any water-based activity. Additionally, any of the devices can include a strap that allows the devices to be securely attached to the user, thereby reducing the risk of a device being lost underwater.

Turning now to FIG. 6, a table listing technical specifications for a headset receiver, a headset transmitter, and a case in accordance with an embodiment of the invention are shown. However, it should be noted that other arrangements and transmitters, receivers, and cases having differing technical specifications can be utilized as appropriate to the requirements of specific applications of embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required.

What is claimed is:

1. A wireless communication system comprising:
   a receiver system comprising:
      a receive antenna configured to receive a radio frequency signal;
      at least two impedance matching networks, a first water-adapted impedance matching network adapted for reception in a water environment and a second air-adapted impedance matching network adapted for reception in an air environment;
      a switch configured to select between the at least two impedance matching networks;
      a signal decoding circuit configured to decode a received radio frequency signal received by the receive antenna;
      an amplifier configured to amplify a decoded signal decoded by the signal decoding circuit; and
      a user output.

2. The wireless communication system of claim 1, wherein the receive antenna is a folded dipole with equivalent length in free space of 75 cm.

3. The wireless communication system of claim 1, wherein the receive antenna is printed on a receiver enclosure using laser direct structuring.

4. The wireless communication system of claim 1, wherein at least one impedance matching network comprises two capacitors in parallel connected to an inductor in series to ground.

5. The wireless communication system of claim 1, wherein the switch is controlled by the output of a water sensor to select the water-adapted impedance matching network when the output indicates a water environment and to select the air-adapted impedance matching network when the output indicates an air environment.

6. The wireless communication system of claim 1, wherein the user output comprises one or more bone conduction elements.

7. The wireless communication system of claim 1, further comprising:
   a transmitter system comprising:
      one or more audio inputs;
      an audio encoder;
      an amplifier; and
      a transmit antenna.

8. The wireless communication system of claim 7:
   wherein the one or more audio inputs of the transmitter system comprises at least two audio inputs, one of which is a microphone; and
   the transmitter system further comprises a mixer.

9. The wireless communication system of claim 7, wherein the audio encoder is configured to generate a radio frequency signal in a band between 174-216 MHz.

* * * * *